C. R. MABEE.
PROCESS OF EVAPORATION.
APPLICATION FILED DEC. 3, 1910.

998,020.

Patented July 18, 1911.

UNITED STATES PATENT OFFICE.

CHARLES R. MABEE, OF DETROIT, MICHIGAN, ASSIGNOR TO STEPHEN A. GRIGGS, TRUSTEE, OF WALKERVILLE, CANADA.

PROCESS OF EVAPORATION.

998,020.  Specification of Letters Patent.  Patented July 18, 1911.

Application filed December 3, 1910. Serial No. 595,350.

*To all whom it may concern:*

Be it known that I, CHARLES R. MABEE, a citizen of the United States, residing at Detroit, county of Wayne, State of Michigan, have invented a certain new and useful Improvement in Processes of Evaporation, and declare the following to be a full, clear, and exact description of the same, such as will enable others skilled in the art to which it pertains to make and use the same, reference being had to the accompanying drawings, which form a part of this specification.

This invention relates to the process of evaporation by which water is or may be separated from any solid substance that is either dissolved in it or contained in it in suspension.

The drawings show an adequate means for producing the results which carry out the process, but do not by any means show all the different varieties of means by which the process can be carried on.

Figure 1:
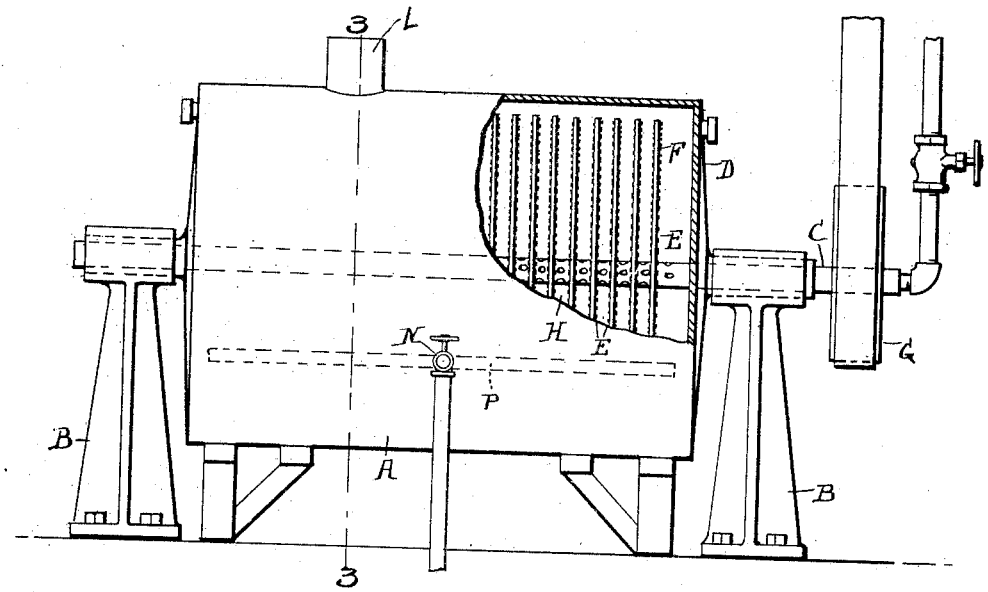
Figure 2:
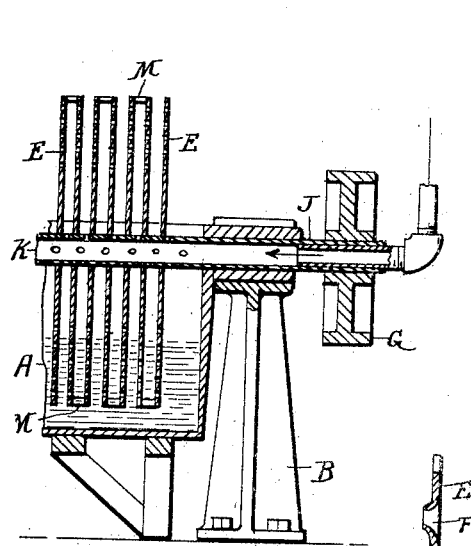
Figure 4:
Figure 3:
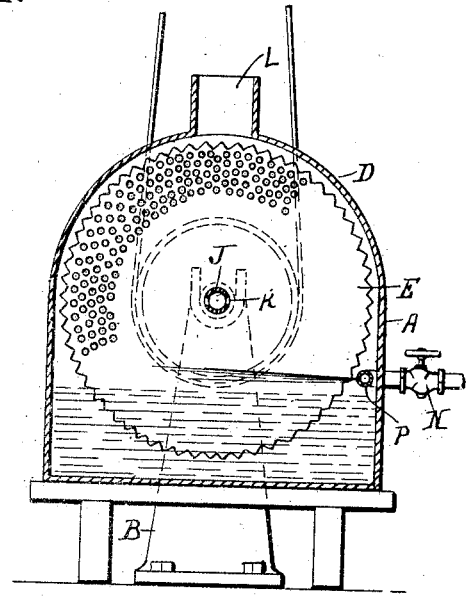

In the drawings:—Figure 1, is an elevation of a machine comprising a tank and revolving perforated disks adapted to carry out the process. Fig. 2, is a section longitudinal of the shaft of the same apparatus. Fig. 3, is a side elevation of one of the disks. Fig. 4, is a section through a portion of one of the disks.

In carrying out the process which involves this invention, the main feature consists in capturing and carrying small isolated masses of air into and below the surface of the liquid which is to be evaporated, liberating the isolated masses of air under the liquid, preferably discharging them through the liquid in process of evaporation and allowing the isolated masses to extract heat from the liquid, thereby themselves becoming expanded, and capable of absorbing the vapor to a greater extent than colder masses of air could, rising through the liquid to the top thereof while so absorbing the liquid or vapor, and then carrying away the saturated air which has escaped from the liquid.

It is a well known fact that water subjected to heat in a tank becoming hotter until it is transformed from liquid water into vapor or steam, requires under quite favorable circumstances a pound of coal to evaporate about from 7 to 8 pounds of water. If a vacuum is employed over the surface of the liquid and is what is known commercially as a single effect vacuum the amount evaporated is about the same. If a double or triple effect vacuum be used, slightly increased quantities of water are converted into steam, but with the process that has been described heretofore, I have found experimentally that with a single pound of coal raising the liquid to be treated to about 150 degrees, I can produce an evaporation of 18 pounds and upward, and this I attribute to the fact that I seize comparatively cool air from a position above the liquid, carry it in its comparatively cool state under the surface of the liquid and as nearly as possible to the bottom of the tank, distributing the air in small particles through the liquid as widely as possible and allowing the small particles to rise through the heated liquid and escape from the surface, whence they are driven away by moving currents of air, as by a fan, the use of a fan or some similar air moving apparatus being required for continuous work.

Air, at 70 degrees, which may be considered as about the normal temperature, carries not to exceed 7.94 grains of moisture per cubic foot. The same air heated to 125 degrees will carry 37 grains of moisture per cubic foot. If the temperature be raised from 125 degrees to 150 degrees, the water carrying capacity is doubled and a cubic foot will now carry 73 grains. At 195 degrees the cubic foot can carry 194 grains of moisture, and at 212 degrees the carrying capacity has reached 265 grains per cubic foot. (Gardner's table.) It is therefore highly desirable that the air introduced be either cool air or air that has been heated while dry. If cool air be introduced under the water it absorbs heat from the water and increases its capacity thereby; if warm air be introduced in a dry state it will produce proportionately good results, and therefore it is not essential that heat be applied directly to the liquid, although that is probably the most economical way of carrying out the result. The heat may be applied to the air and the air delivered under the liquid in as dry a condition as possible and in as heated a condition as may be suitable for the product to be produced. In either case the results will be substantially the same.

It is also highly desirable that the mechanism which carries the air into the water be a moving mass, in preference to a device which carries air in as through a pipe. Especially is this desirable where the heat is applied to the outside of the vessel containing the liquid, for the reason that when heat is applied to a vessel containing liquid there is soon a formation of little bubbles, either air bubbles or vapor bubbles, according to the temperature applied to the outside of the vessel, and these bubbles, small in size, adhere by cohesion to the surface of the vessel or to the surface of pipes in the vessel, to such an extent that, as is well known in laboratory experiments, with care the liquid in a smooth glass vessel may be heated to considerably above the boiling point, as 215 degrees, with a formation of a film of air or vapor along the sides of the vessel, and if the cohesion of this film be broken and the bubbles allowed to escape, there will be an almost explosive ebullition of the liquid in the flash. It is highly desirable commercially that these bubbles be prevented from adhering to the sides of the vessel and the moving air carrier of this device, and all devices which are preferably used in carrying out this process, throw the liquid into commotion and largely prevent the adhesion of bubbles to any part of the surface. These little bubbles which form on the surface and adhere to the surface of a vessel that is heated act as insulators against the transmission of heat through that portion of the surface over which they spread, the metal of the vessel at that point becoming hotter than the boiling point of the liquid, and remaining hotter without any beneficial evaporating effect until the insulation is destroyed by removing the bubbles.

In actual action the process described enables me to remove a large amount of liquid in the form of vapor without causing the vapor to absorb the large amount of heat necessary to convert the liquid into steam. As is well known, water when it is transformed into steam absorbs at the critical point 965-7/10 B. T. U., whereas, a large part of the vapor which is produced by this process consists of globules or masses and requires only thermal units necessary to raise it to the temperature of the out-going vapor. The apparatus employed to carry out this process in the open air or under normal conditions of air pressure may be usefully employed when inclosed in what is commercially termed vacuum pans, which are not in fact vacua, but apparatus for reducing the pressure by 26 or 27 inches as an extreme. This apparatus, used in connection with a so-called vacuum apparatus, will produce the desired effects and will cause the breaking up of the cohesion of the particles of gas or vapor forming on the sides of the vessel and thus aids greatly in evaporation.

In carrying out the process the apparatus illustrated in the drawings is well adapted to produce good results. The apparatus shown comprises a tank A in which the liquid to be evaporated is placed. Properly journaled with respect to the tank A on bearings B is a hollow shaft C upon which are mounted a number of perforated disks E, the disks being preferably so perforated that the rim of each perforation F or H projects at the side beyond the surface of the disk. Motion is communicated to the shaft C by any suitable means, as by means of a pulley wheel G and the shaft with the disks secured thereto is rotated, the disks dipping into the liquid and passing through it, and in the travel each disk carries down into the liquid the air which becomes trapped or caught in the hole F or the hole H, and any air which may be trapped or caught underneath or around the projecting rims of the holes. The continued rotation of the shaft and of the disks carries quantities of air into the liquid which becomes detached from the disks and rises through the liquid in the manner described in the description of the process hereinbefore given. The air above the liquid is moved by a blast that passes through a hollow shaft and escapes from perforation K in the sides of the shaft or along the course of the shaft. Preferably, the tank is made as a covered vessel and the air crowded out from the vessel escapes through the vent opening L. In place of the hollow shaft or additional thereto air tube, an air pipe N leading through the side of the vessel may conduct air under force into the tank above the surface of the liquid.

What I claim is:—

1. The process of evaporating liquids consisting in mechanically introducing air in isolated masses into the liquid and carrying same below the surface thereof, allowing the introduced air to absorb vapor from the liquid and escape therefrom, substantially as described.

2. The process of evaporating liquids consisting in placing the liquid in a tank and carrying air in isolated masses into the liquid, agitating the liquid and dispersing the introduced air, allowing the introduced air to rise in bubbles through the liquid and escape from the surface thereof, substantially as described.

3. The process of evaporating liquids consisting in placing the liquid in a tank, carrying air into the liquid in isolated masses, dispersing the isolated masses of air in the form of bubbles through the liquid, allowing them to rise through the liquid absorbing moisture therefrom and escaping from the surface thereof and removing the escaping vapor from the surface by mechanical means, substantially as described.

4. The process of evaporating liquids consisting in treating the liquid in a tank by air passing over the surface thereof under forced blast and by mechanically carrying from the surface downward isolated masses of air, allowing the air carried downward to absorb vapor from the liquid and to escape therefrom, substantially as described.

In testimony whereof, I sign this specification in the presence of two witnesses.

CHARLES R. MABEE.

Witnesses:
 VIRGINIA C. SPRATT,
 VERA PILLMAN.